United States Patent [19]

Beck

[11] Patent Number: 5,547,050
[45] Date of Patent: Aug. 20, 1996

[54] SHOCK ABSORBER HAVING A PISTON PERMANENTLY ATTACHED TO ITS PISTON ROD

[75] Inventor: Hubert Beck, Eitorf-Keuenhof, Germany

[73] Assignee: Fichtel & Sachs AG, Schweinfurt, Germany

[21] Appl. No.: 239,365

[22] Filed: May 6, 1994

[30] Foreign Application Priority Data

May 10, 1993 [DE] Germany ........................ 43 15 457.3
May 10, 1993 [DE] Germany ........................ 43 15 458.1

[51] Int. Cl.⁶ .................................................. F16F 9/34
[52] U.S. Cl. ........................ 188/322.15; 188/322.22; 29/888.044; 29/517; 29/523; 403/278; 403/271
[58] Field of Search ............... 188/322.15, 322.22, 188/317; 403/271, 270, 282, 278, 274; 29/888.044, 888.04, 517, 516, 515, 522.1, 523, DIG. 48; 92/172, 257

[56] References Cited

U.S. PATENT DOCUMENTS

| 3,056,473 | 10/1962 | Zeidler | 188/322.15 X |
|---|---|---|---|
| 3,214,511 | 10/1965 | Franklin | 29/517 |
| 3,312,150 | 4/1967 | Strader . | |
| 3,808,956 | 5/1974 | Knapp | 92/172 |
| 3,868,192 | 2/1975 | Pennington et al. . | |
| 3,896,908 | 7/1975 | Petrak | 188/322.15 X |
| 4,064,977 | 12/1977 | Taylor . | |
| 4,121,704 | 10/1978 | Nicholls | 188/322.15 X |
| 4,203,507 | 5/1980 | Tomita et al. . | |
| 4,624,347 | 11/1986 | Mourray . | |
| 4,650,043 | 3/1987 | Eckersley . | |
| 4,791,712 | 12/1988 | Wells et al. | 29/888.044 X |

FOREIGN PATENT DOCUMENTS

| 2306899 | 8/1974 | Germany | 29/888.044 |
|---|---|---|---|
| 3425079 | 1/1986 | Germany | 29/888.044 |
| 3820307 | 7/1989 | Germany . | |
| 665358 | 1/1952 | United Kingdom | 29/523 |
| 8912769 | 12/1989 | WIPO . | |

*Primary Examiner*—Robert J. Oberleitner
*Assistant Examiner*—Lee W. Young
*Attorney, Agent, or Firm*—Nils H. Ljungman & Associates

[57] ABSTRACT

A shock absorber valve for a hydraulic telescoping strut shock absorber, has, running through a valve body, passages whose respective outlet-side openings are covered by ring-shaped valve discs, whereby the valve discs and the valve body are fastened and axially braced in line. A fully-automated assembly with short cycle times using the dry process can be made possible, whereby a valve closing force independent of tolerances is achieved by using a method which generates as few chips from cutting and machining as possible. To achieve this, the valve discs and the valve body are fastened and prestressed onto a cylindrical component using a fastening element, which fastening element is non-detachably fixed to the cylindrical component.

2 Claims, 17 Drawing Sheets

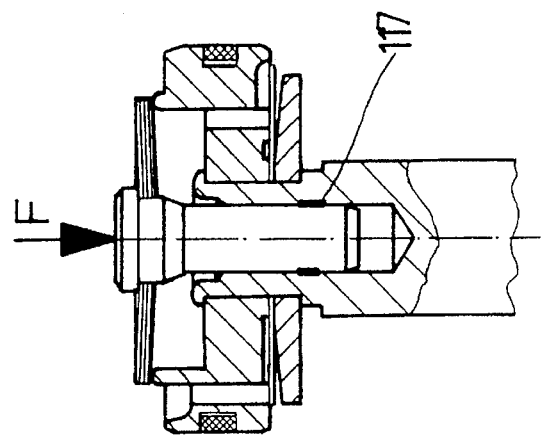
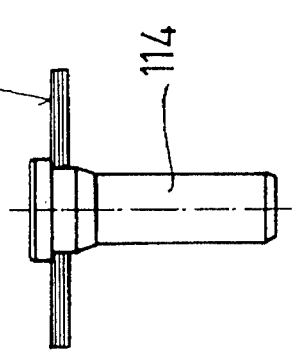
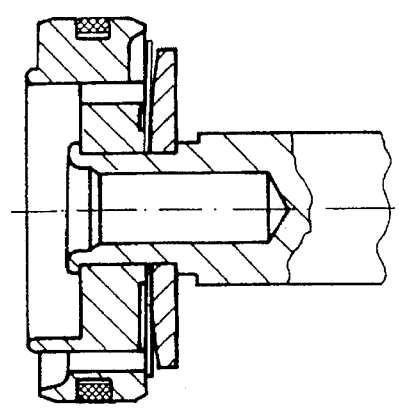
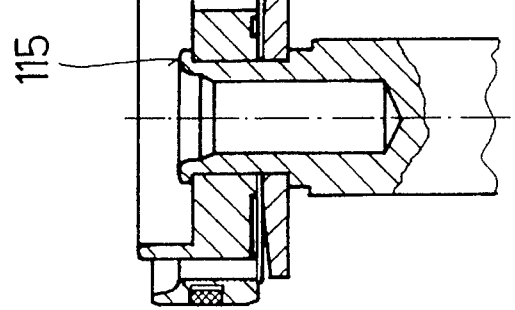
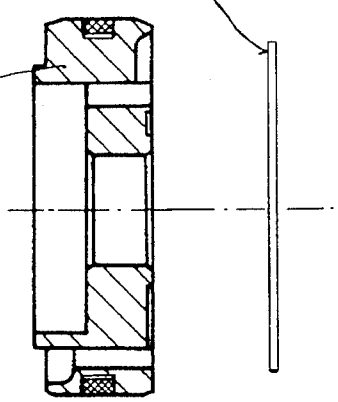
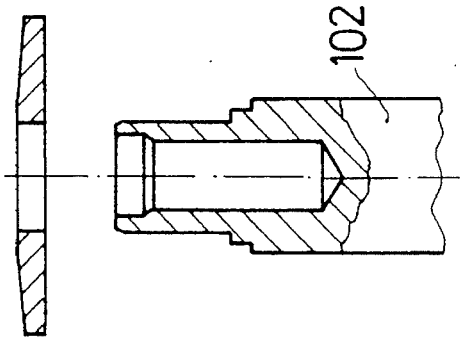
FIG. 8a   FIG. 8b   FIG. 8c   FIG. 8d

PRIOR ART

SHOCK ABSORBER HAVING A PISTON PERMANENTLY ATTACHED TO ITS PISTON ROD

BACKGROUND OF THE INVENTION

1. Field of the Invention

This invention generally relates to a shock absorber valve for a hydraulic telescoping shock absorber, in which, running through a valve body, there are passages whose respective output-side openings are covered by ring-shaped valve discs, whereby the valve discs and the valve body are fastened and axially braced in line on a journal.

2. Background Information

Such a valve for hydraulic telescoping strut shock absorbers is disclosed in German Patent No. 38 20 307, in which the valve is located in the piston of the telescoping strut shock absorber, whereby the leaf springs for the pressurization of the passages are actuated by a coil spring. The leaf springs, the valve body and the coil spring are thereby axially threaded onto a journal of the piston rod, and are braced and fastened by a piston nut.

It is essentially always a complex, expensive and time-consuming operation to manufacture the threaded portion of the journal. An additional disadvantage is that a threading process basically entails a notching action which significantly reduces the tensile strength of the journal. Measures must also generally be taken to secure the piston nut.

OBJECT OF THE INVENTION

The object of the present invention is to create a valve for a shock absorber which can be assembled and secured fully automatically with a short cycle time, and which also essentially eliminates the disadvantages of the valves utilized in the past.

SUMMARY OF THE INVENTION

The present invention teaches that this object can preferably be accomplished by fastening at least some of the valve discs and the valve body on the journal by means of an essentially nondetachable positive fit, which may alternatively be termed a "deformation fit" or a "force fit".

All the disadvantages of a threaded connection used in the past can essentially be eliminated by the nondetachable positive fit. Likewise, there are essentially no adjustment problems for the valve damping force, since the effect of friction inside the above-referenced threaded connection is preferably essentially eliminated.

To prevent the formation of chips from cutting or machining processes, one advantageous feature of the present invention is that the fastening is preferably a positive fit and/or a weld joint. Such a valve construction can preferably be installed essentially without problems in a piston, and also as a bottom valve in the shock absorber.

The present invention also teaches that the positive fit is preferably formed by the journal. According to an additional advantageous feature of the present invention, the journal preferably has a blind hole, so that a ring wall is formed which ring wall preferably has an overhang in relation to the valve discs and valve body threaded onto it, whereby the overhang can preferably form the positive fit by means of a bead. There is also advantageously an overlap between the blind hole and the valve body. Thus, a bearing force can be achieved which causes an additional axial force, but also essentially eliminates the play which can be present, under some circumstances, between the valve body and the journal.

So that the valve discs cannot be damped uncontrollably, there is preferably at least one supporting ring for the valve discs located inside the row of components axially braced in line. In an additional advantageous embodiment of the present invention, the supporting ring preferably has a rolling contour, so that the damping occurs according to a desired behavior. For example, in one advantageous configuration, the rolling contour can be formed by two connected, essentially conical surfaces. The result is a damping force characteristic which is preferably graduated.

To reduce the manufacturing costs for the valve body, in the function of a piston valve, the piston ring is fastened to the valve body preferably without undercutting. The use of a sintered valve body can also result in major advantages in terms the sintering dies. For a valve body made of sheet metal, the deforming expense can also essentially be reduced. To increase the allowable axial load of the piston ring, one supporting ring preferably has a fastening surface for the piston ring.

An additional advantageous feature of the present invention is that the supporting ring, with its fastening surface, can preferably be partly supported on the end face of the valve body. The piston ring is thereby preferably excluded from the row of axially braced components of the valve in terms of tolerances.

In an additional configuration, the valve discs facing the piston rod and the valve body are preferably fixed axially.

From a manufacturing point of view, an advantage of the present invention when incorporated on the piston of a shock absorber, is that the cylindrical component is preferably a component of the piston rod. The piston rod can thereby be provided with a journal in the vicinity of its piston, so that this journal can be used for the axial threading of the valve discs and valve body.

One characterizing feature of the present invention is that the cylindrical component is preferably provided with a hole, in which a cylindrical component provided with the valve discs is fastened.

To preferably achieve a positive fit by a non-cutting forming operation, in one embodiment of the present invention, the cylindrical component is preferably surrounded by the fastening element, and the cylindrical component is expanded from inside to outside.

According to an additional characterizing feature of the invention, the expansion of the cylindrical component is preferably accomplished by means of an expander element located in a hole of the cylindrical component. A sphere can be advantageously used as the expander element.

To further improve the positive fit, preferably between the fastening element and the cylindrical component, the cylindrical component and/or the fastening element is/are provided, preferably on the surfaces facing one another, with at least one projection and/or one recess. The projection and/or the recess preferably run in an annular fashion over the entire circumference.

In an additional configuration, the fastening element is preferably made of light metal or a light metal alloy, and the fastening element is preferably shrink-fitted, onto the cylindrical component in an essentially contactless manner by electrically pulsed magnetic fields.

BRIEF DESCRIPTION OF THE DRAWINGS

Preferred embodiments of the invention are schematically illustrated in the accompanying drawings.

FIGS. 8a–8d illustrate the sequence of assembly of one realization of a piston;

DESCRIPTION OF THE PREFERRED EMBODIMENT

Figure 1:
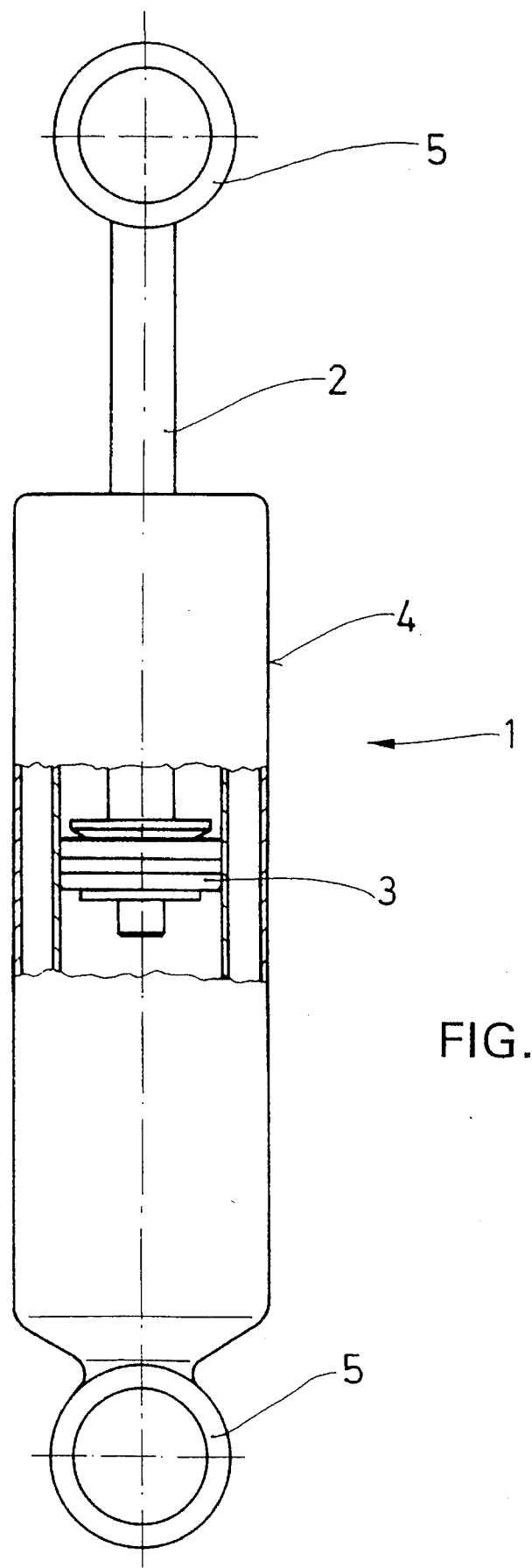
FIG. 1 shows a shock absorber, partly in cross section and partly in a plan view.

FIG. 1 illustrates a shock absorber which preferably includes an external tube 4, a piston 3 fastened to a piston rod 2, and the fastening devices 5 which are preferably fastened to the piston rod 2 and to the external tube 4.

Figure 2:
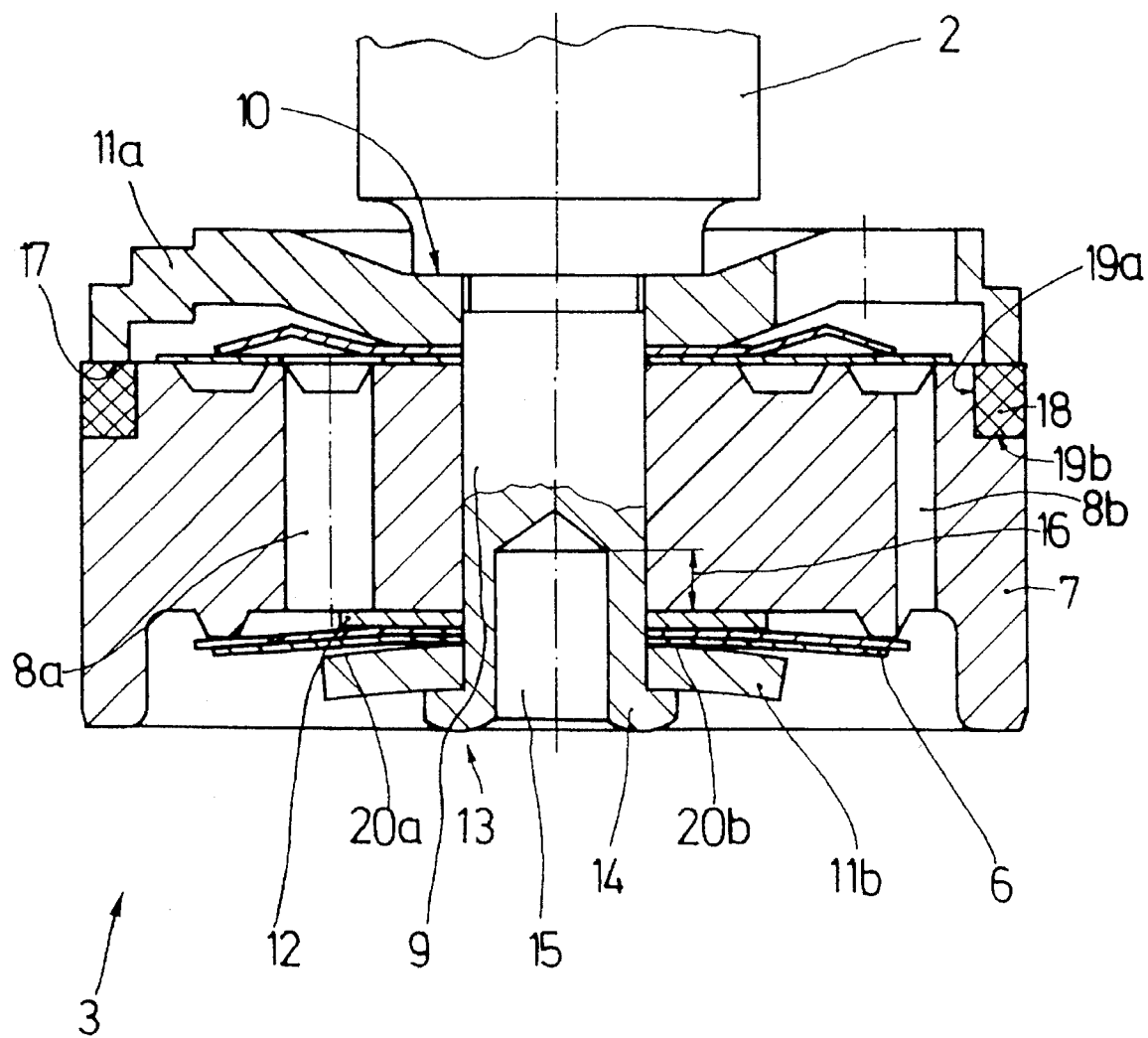
FIGS. 2 and 3 show a piston of a shock absorber in cross section.

The piston 3 illustrated in FIG. 2 essentially includes a valve body 7, which valve body 7 is preferably provided with passages 8a/8b, one for each direction of flow. The passages 8a/8b are preferably covered at their outlet openings by valve discs 6. Depending on the desired damping force setting, valve disc packets or stacks can also be used, whereby valve discs of various thicknesses, graduated diameters or advance opening cross sections can preferably be set inside the packet.

The piston 3 is preferably guided or centered by a journal 9, which journal 9 is a component of the piston rod 2. A supporting ring 11a is preferably supported on a shoulder 10 of the piston rod 2, and is preferably adjacent to a series of components consisting of a valve disc packet 6, the valve body 7, a throttle disc 12 and an additional supporting ring 11b. Preferably, by means of a positive fit 13, the piston 3 is fastened to the piston rod 2.

The fastening of the piston 3 to the piston rod 2 is preferably achieved by means of a bead 14. For this bead 14, a blind hole 15 is preferably worked into the journal 9. This blind hole 15 can advantageously have an overlap 16 with the valve body 7. During the forming process, which forming process can preferably be forging or possibly cold-forging, an additional axial force component is preferably applied, and a compensation of play between the valve body 7 and the journal 9 is thereby achieved by means of bearing forces in the vicinity of the overlap 16, so that the valve body 7 is preferably fixed on all sides.

In other words, as axial force is applied by a suitable tool during forming, the diameter 9a (see FIG. 2a) of journal 9 is preferably expanded so that any play between the journal 9 and the valve body 7 is substantially decreased, or possibly eliminated. The forming tool is preferably forced into blind hole 15, thereby expanding the walls of journal 9 and simultaneously forming the beads 14. Thus, the fit between journal 9 and valve body 7 is preferably much tighter than the fit which is typically achieved by a conventional nut arrangement (i.e. a nut threaded onto journal 9). Thus, any rattles which can be caused by the contact between journal 9 and valve body 7 can preferably be substantially reduced or eliminated. Further, the present invention essentially permits the valve body 7 to be centered on the journal 9 more accurately, since essentially all play between valve body 7 and journal 9 is eliminated.

Generally, during the forming process, the journal 9 will preferably expand substantially equally all around its circumference, thereby grasping the valve body 7 of the piston 3 preferably on all sides. The end result is preferably a "mushroomed" shape.

The supporting rings 11a and 11b, preferably located inside and outside the row of axially braced components, also each preferably perform an additional function. For example, the supporting ring 11a preferably has a fastening surface 17 as an additional measure to secure a piston ring 18, which piston ring 18 is preferably guided essentially without undercutting, i.e. in this case by means of two contact surfaces 19a and 19b on the valve body 7. With regard to the supporting ring 11b, it should be noted that the ring 11b preferably has a rolling contour which can be used to influence the damping force characteristic. In this embodiment, the rolling contour is preferably formed by two essentially conical surfaces 20a/20b. As a result of this particular shaping process, the damping force characteristic has a progressive curve in the range of higher flow velocities.

Figure 2A:
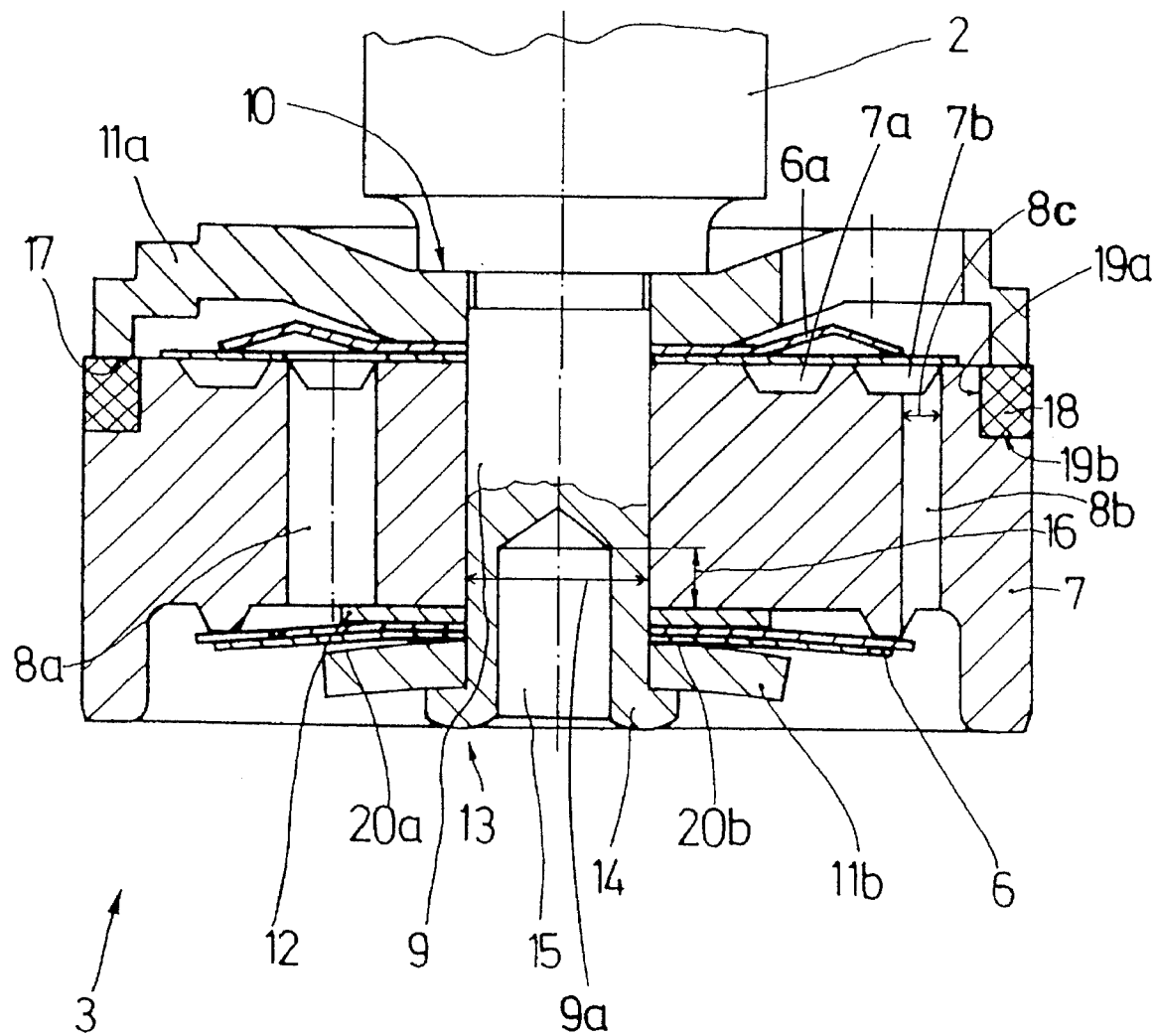
FIGS. 2a and 3a show substantially the same views as FIGS. 2 and 3, but show additional components.

Further, in one preferred embodiment as shown in FIG. 2a, the valve body 7 may have two preferably concentric grooves 7a and 7b. The grooves 7a and 7b may preferably serve to assist in increasing the pressure force generated by passage 8b, since passage 8b has a relatively small diameter 8c. The piston 3 may also include a spring body 6a or possibly a spring valve.

Figure 3:
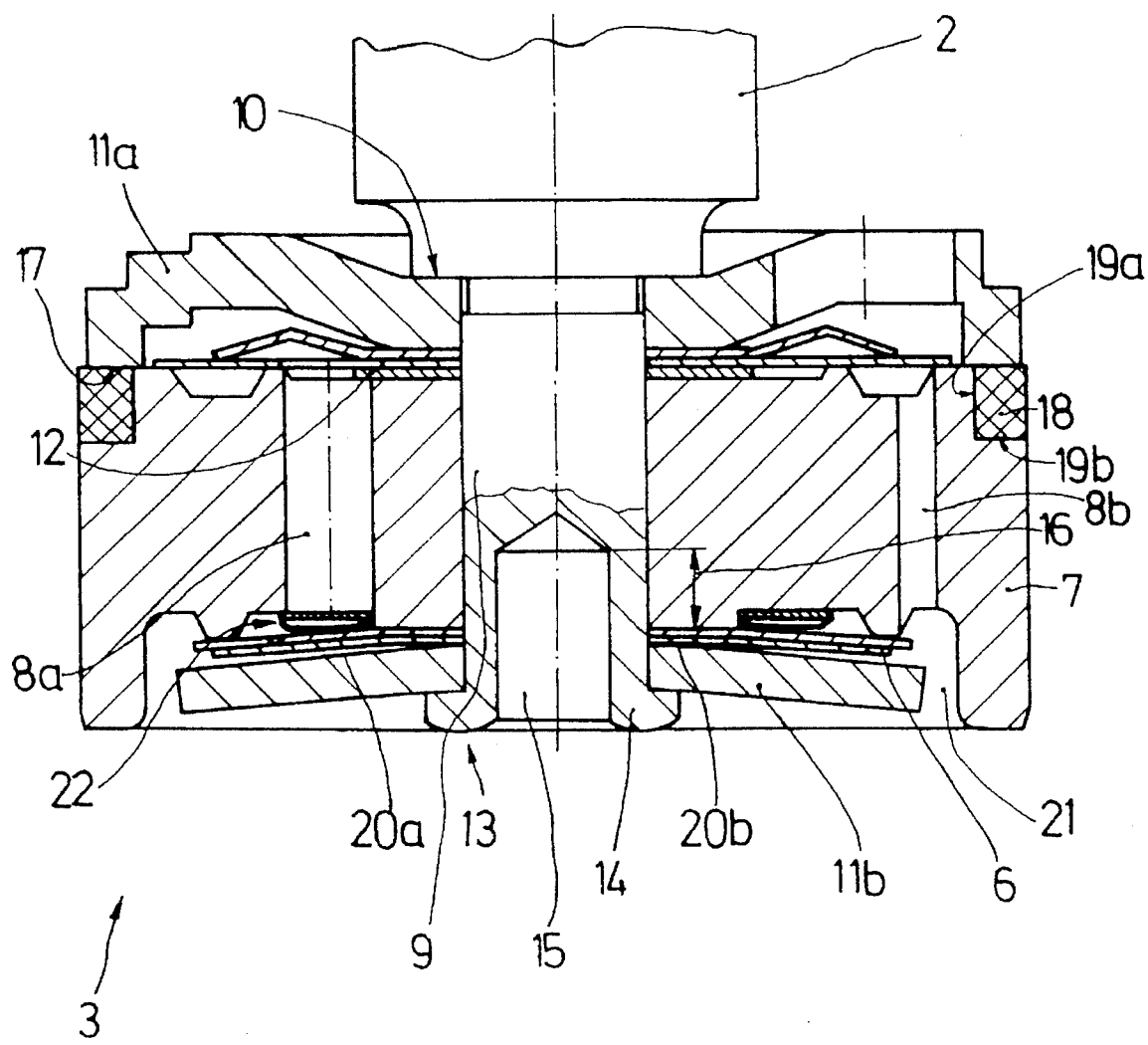
Figure 3A:
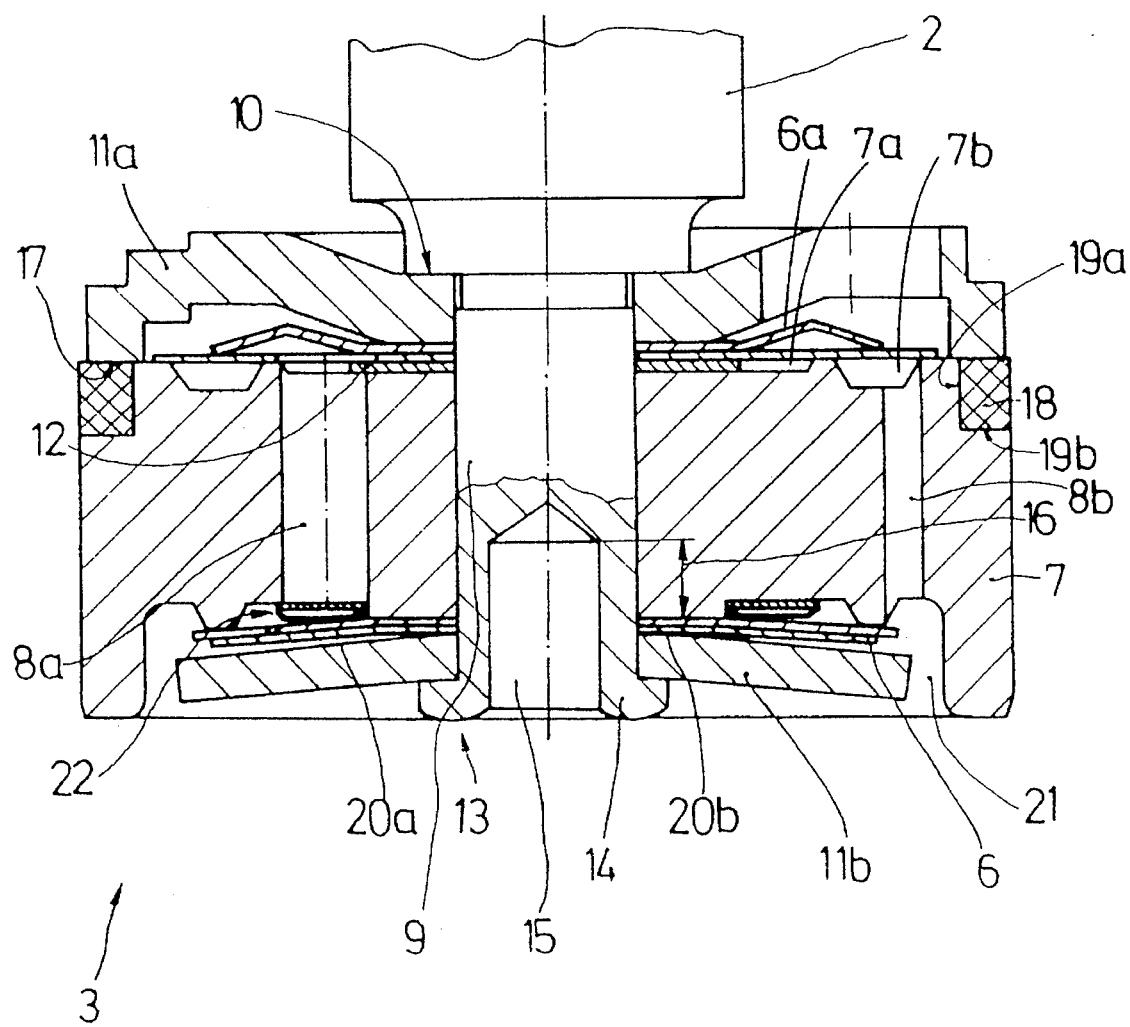

The embodiment illustrated in FIG. 3 is essentially distinguished from the embodiment illustrated in FIG. 2 in one aspect by the fact that the supporting ring 11a, with its fastening surface 17, is preferably at least partly supported on the end face of the valve body 7. The fastening surface 17, as well as the contact surfaces 19a and 19b, preferably form a chamber for the piston ring 18.

With regard to the piston ring 18, essentially all that needs to be taken into consideration are the contact surface 19a, and the height of the piston ring.

As a variant of the configuration illustrated in FIG. 2, in FIG. 3 the throttle disc 12 is preferably shifted toward the supporting ring 11a.

Thus, the overlap 16 can be preferably significantly increased while retaining the same depth of the blind hole 15, possibly by relocating the throttle disc 12.

The supporting ring 11b is also preferably designed so that the decrease in pressure inside the valve occurs over a longer flow distance. The supporting ring 11b, together with the valve body 7, preferably forms an annular gap 21, so that unpleasant flow noises can be suppressed.

To influence the valve characteristic, a return stop 22, preferably in the form of a spring body with a cover disc, can be used, in particular if only small volumes need to be handled in the compression direction.

Of course, it should be understood that the valve design described above can also be employed in a bottom valve. Such a bottom valve may include that shown in FIG. 55 of U.S. Pat. No. 4,650,042, granted to Heinz Knecht et al. on Mar. 17, 1987, or that shown in FIG. 1 of U.S. Pat. No. 4,802,561, granted to Heinz Knecht et al. on Feb. 7, 1989.

Figure 4:
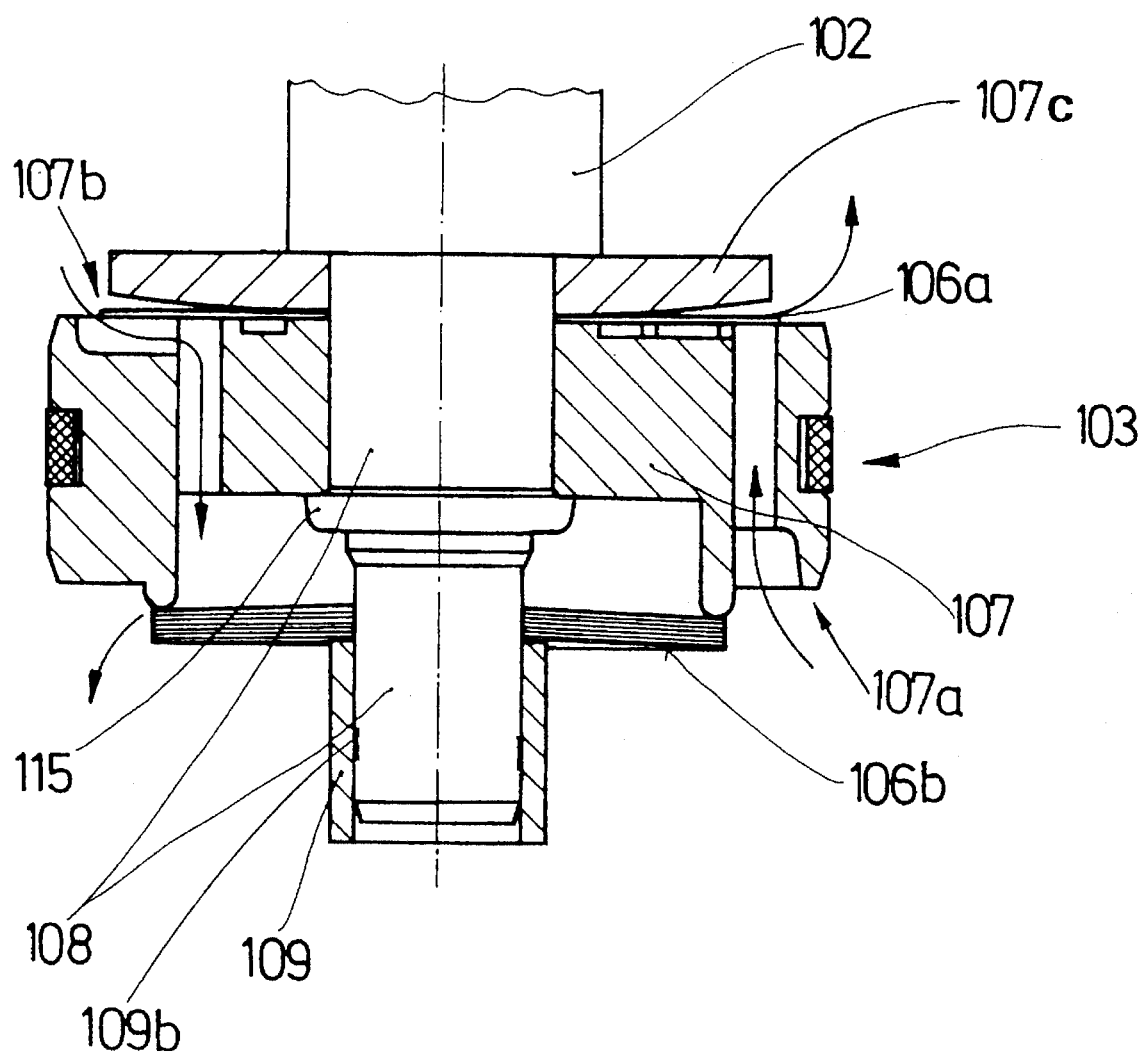
FIGS. 4–7 illustrate various pistons of a shock absorber in cross section; p
Figure 4A:
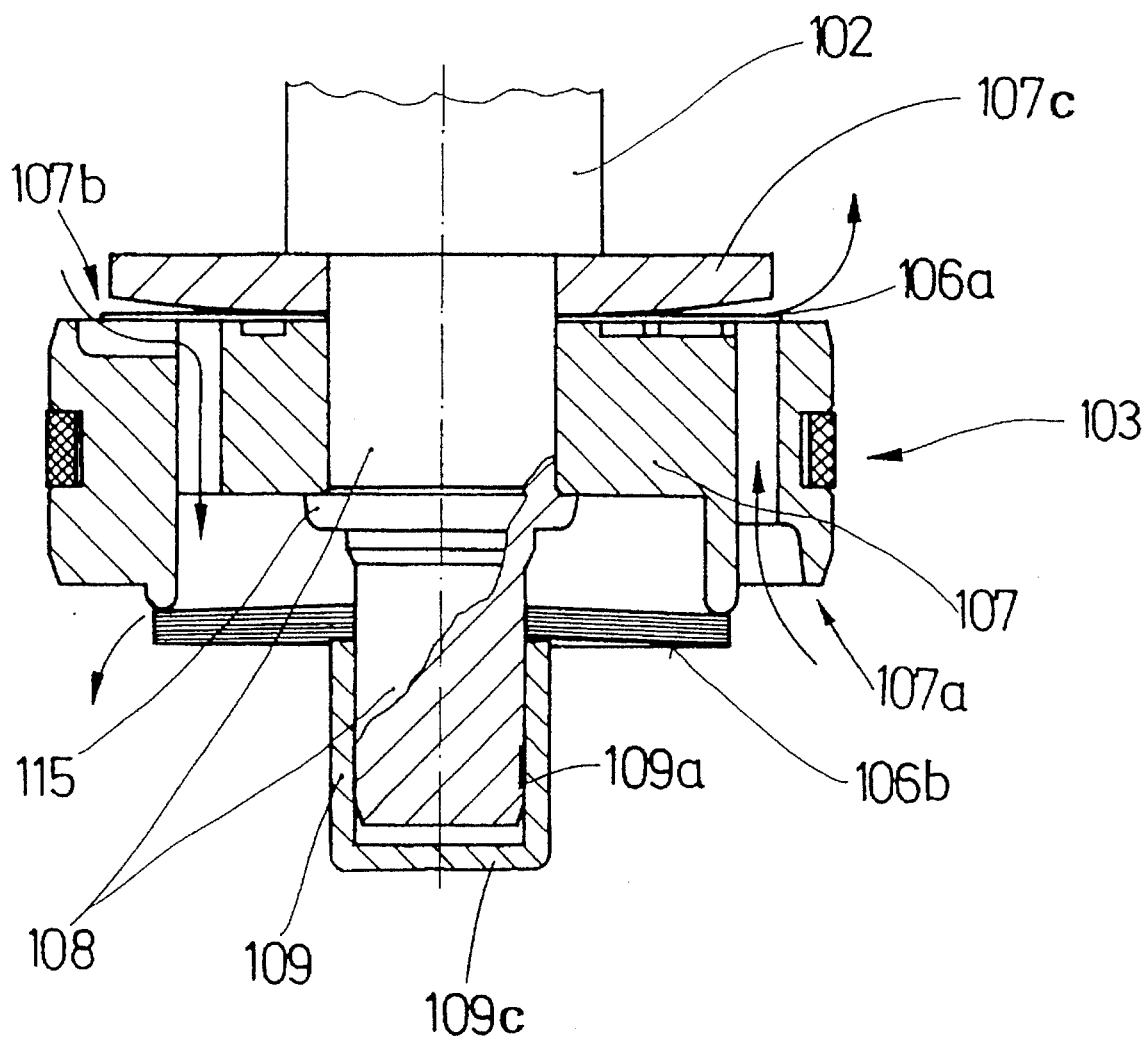
FIG. 4a shows an additional embodiment of a piston similar to that shown in FIG. 4.

FIG. 4 and 4a illustrate two embodiments of a piston 103 in a two-tube shock absorber. In FIG. 4, the piston 103 is illustrated in cross section, whereby on the piston rod 102 there is a preferably cylindrical component 108, which cylindrical component 108 in this embodiment is configured as a journal of the piston rod 102. The cylindrical component 108 preferably holds, in the axial direction, the valve disc 106a and-the valve body 107. The fastening element 109 is preferably pushed onto the cylindrical component 108, and an appropriate prestress is applied. After the application of the corresponding prestress, the fastening of the fastening element 109 preferably to the cylindrical component 108 can be accomplished in the form of a weld joint, e.g. by laser welding, in spots or alternatively over the entire circumference. The two embodiments shown in FIGS. 4 and 4a preferably illustrate an all-around weld seam 109b and a spot weld 109a, respectively. When an all-around weld seam 109b is used, the fastening element 109 can preferably be in the form of a sleeve as shown in FIG. 4a. If, on the other hand, a spot weld 109a is used, the fastening element 109 can preferably be in the form of a pot-shaped component as shown in FIG. 4a.

Thus, if a spot weld 109a is employed, the strength of the fastening element may preferably be increased by including a bottom portion 109c. Thus, the fastening element preferably has the form of a "pot".

The embodiments illustrated in FIGS. 4 and 4a show that the valve body 107 and the valve discs 106a are already fastened to the cylindrical component by means of a riveted joint 115. In an additional assembly step, the valve discs 106b are preferably prestressed and fastened.

Also shown in FIGS. 4 and 4a are passages 107a and 107b, one preferably for each direction of flow. The piston 103, in one embodiment thereof, may also include a valve 107c, which valve may serve to regulate or control the flow through passages 107a and 107b. The passages 107a and 107b, as well as the valve 107c are generally well-known to those of ordinary skill in the art and will not be discussed further here.

Figure 5:
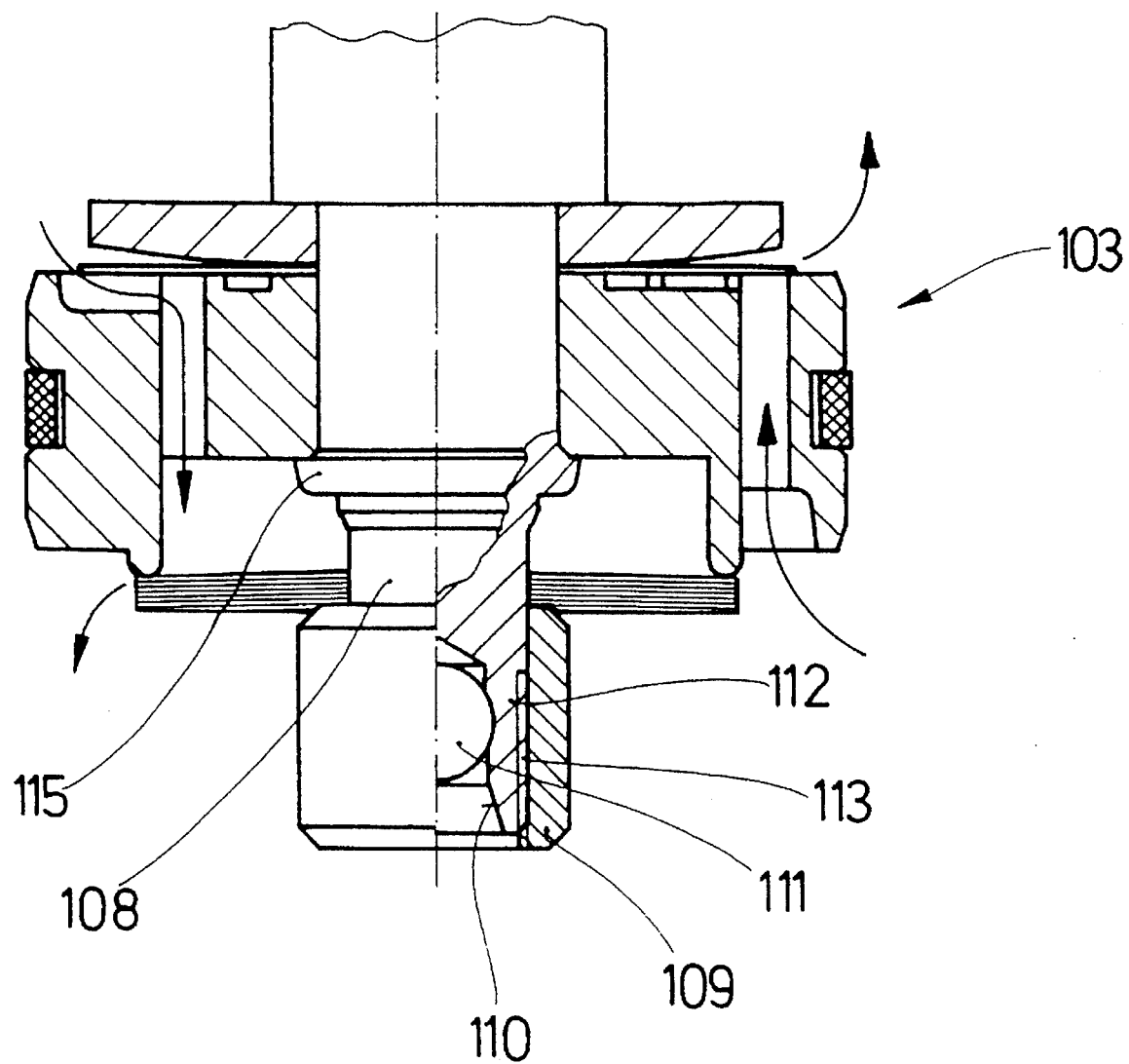

FIG. 5 illustrates a piston 103 of a shock absorber, in which the cylindrical component 108 is preferably provided with a hole 110. A sphere can preferably serve as the expander element 111, and is inserted into this hole 110, so that a positive fit is preferably produced by means of the projections 112 and recesses 113, and by the expansion of the cylindrical component 108 preferably as a result of the pressure exerted by the expander element 111. This spherical closure illustrated in FIG. 4 can also preferably be installed essentially without the generation of any chips which can typically be caused by cutting or machining processes. By means of a corresponding device, or suitable tool, a corresponding pre-stress can be applied to the fastening element 109, whereby the expander element 111, the cylindrical component 108, and the fastening element 109 can then be connected to one another in the respective or desired position. The embodiment illustrated in FIG. 5 is also preferably provided with a riveted joint 115.

Figure 5A:
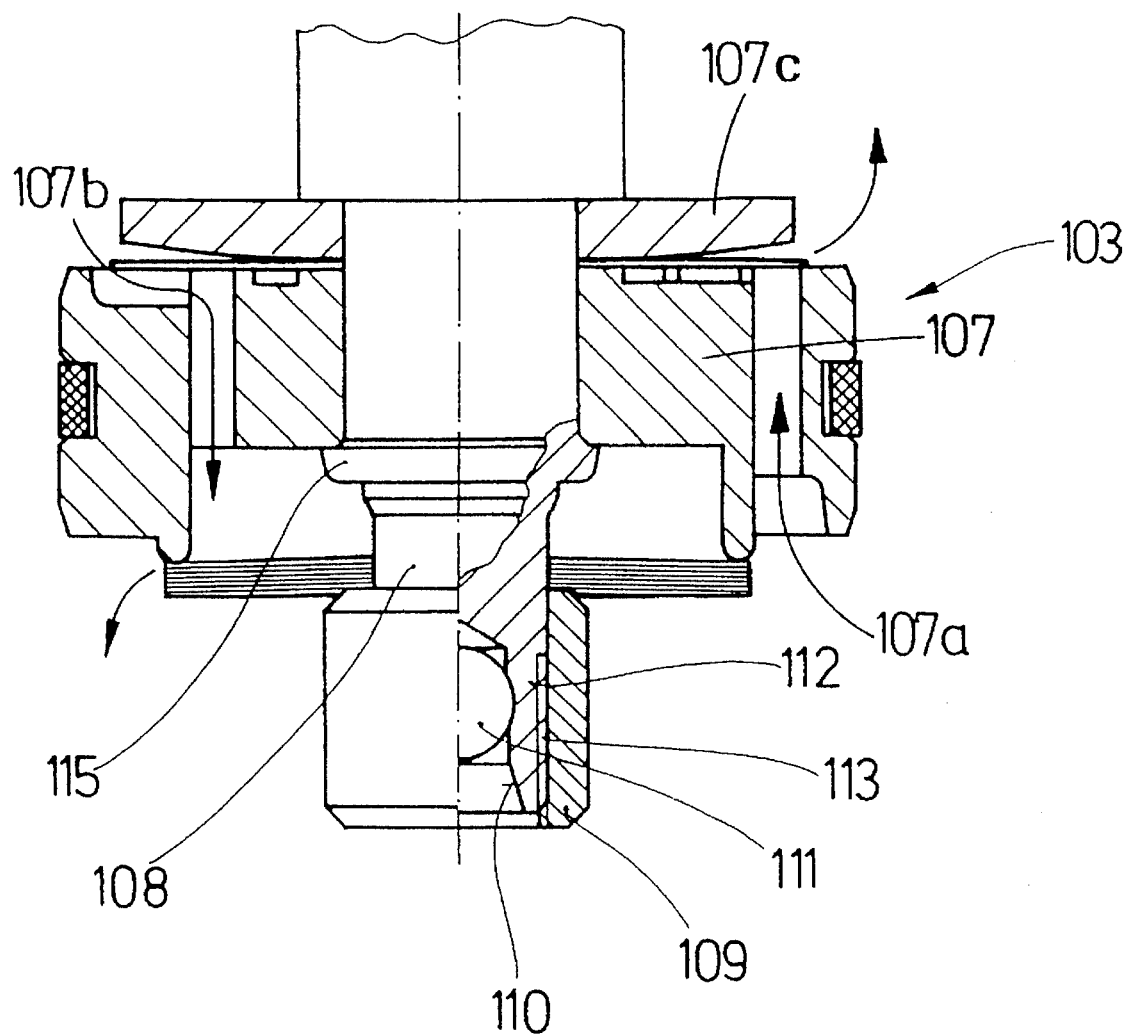
FIGS. 5a, 6a, and 7a show substantially the same views as FIGS. 5–7, but show additional components.

Passages 107a and 107b are shown in the embodiment illustrated in FIG. 5a, one passage preferably for each direction of flow. The piston 103, in one embodiment may also have a valve 107c which valve 107c can-serve to regulate the flow through passages 107a and 107b. The passages 107a and 107b and the valve 107c are generally well-known to those of ordinary skill in the art and will not be discussed further here.

Figure 6:
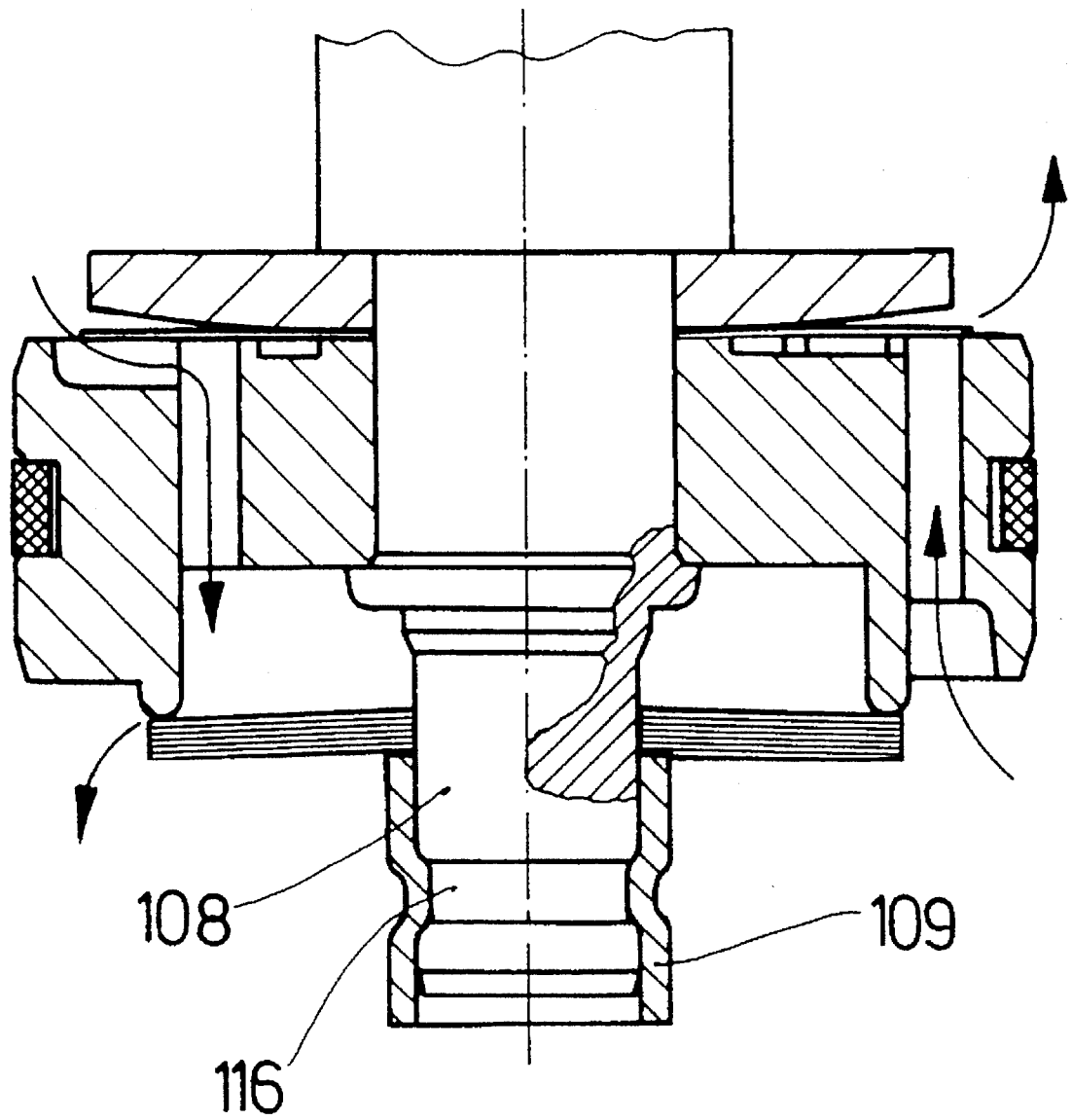

FIG. 6 shows a fastening element 109 preferably made of light metal or light metal alloy, which fastening element 109 has preferably been shrink-fitted in an essentially contactless manner onto the cylindrical component 108. The groove 116 of the cylindrical component is thereby preferably Used to achieve the positive fit.

The type of fastening illustrate in FIG. 6 may also conceivably be accomplished by a compression fitting of fastening element 109 onto cylindrical component 108. In this type of fastening, a suitable tool can preferably be used to grasp fastening element 109 and by compression, force fastening element 109 onto cylindrical component 108.

Figure 6A:
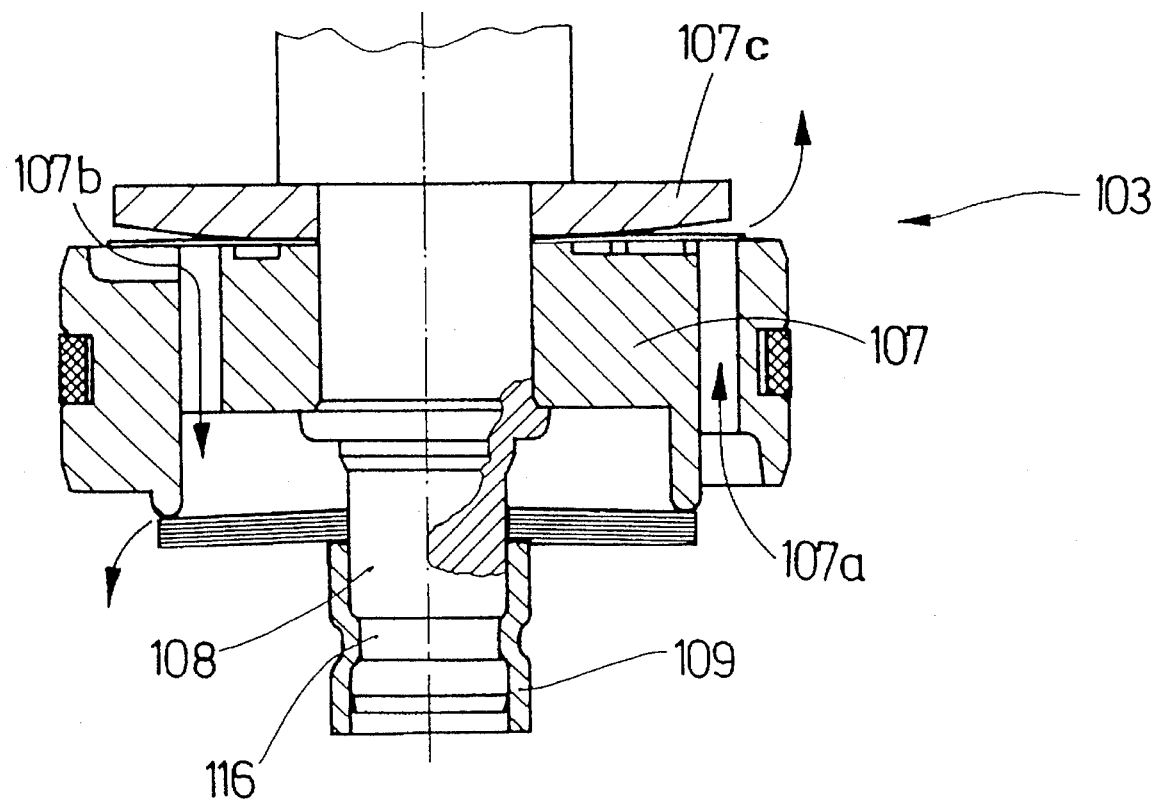

As shown in FIG. 6a, one embodiment of the present invention may include the valve body 107 having passages 107a and 107b, one preferably for each direction of flow. The piston 103 may also include a valve 107c which valve 107c can preferably serve to regulate or control the flow through passages 107a and 107b. The passages 107a and 107b, and valve 107c are well known in the art and will not be discussed further here.

Figure 7:
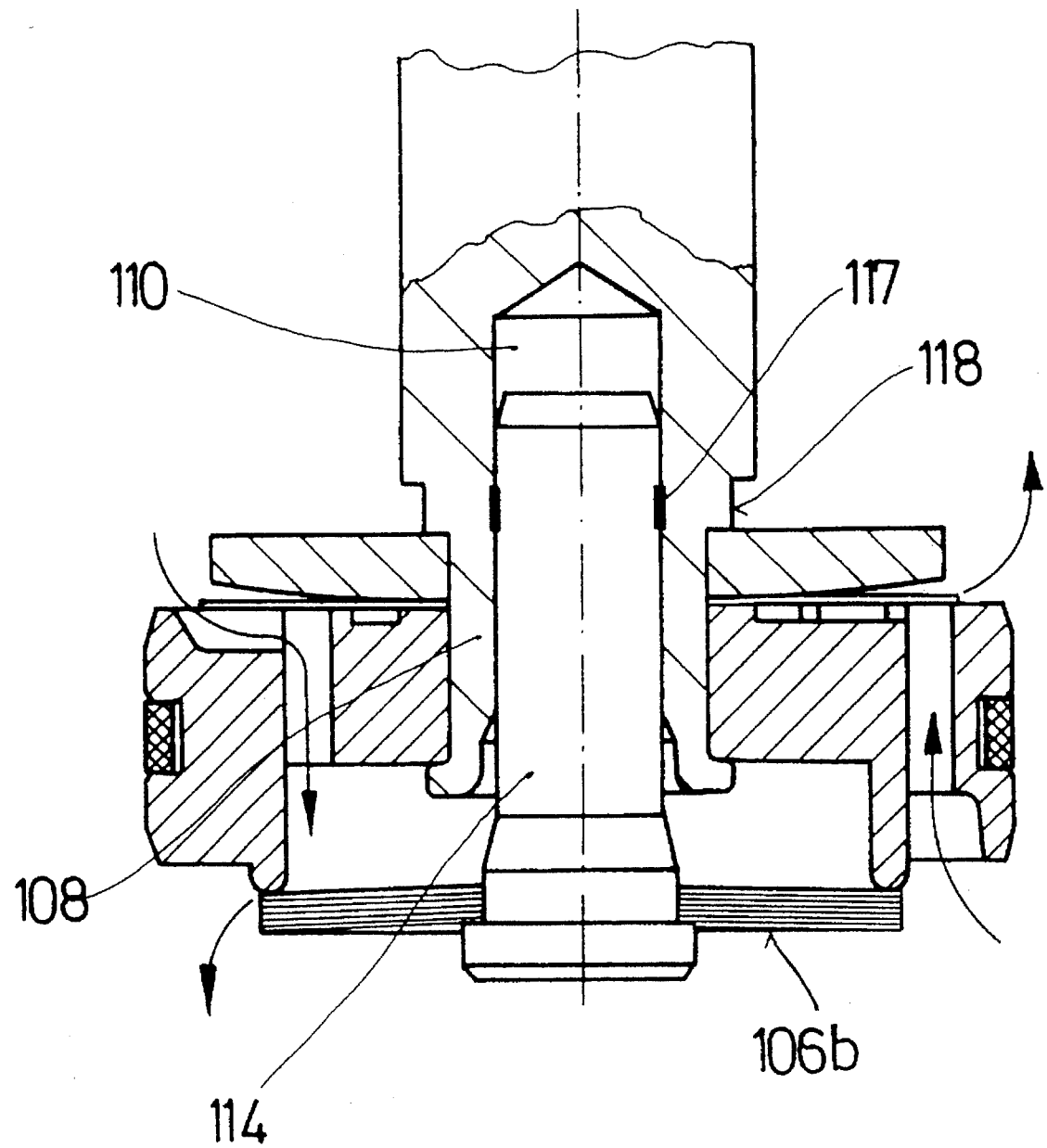

FIG. 7 illustrates an additional type of connection, whereby a cylindrical component 114 is preferably housed in the hole 110 of the cylindrical component 108. After the prestress has preferably been applied by means of the cylindrical component 114 on the valve discs 106b, the fastening can be realized, for example, by means of a laser weld 117. The shoulder 118 preferably reduces the distance from the outside to the weld point 117, or in different embodiments the shoulder 118 can preferably be used to achieve a distance which is preferably approximately equal along the circumference of the cylindrical component 108.

Figure 7A:
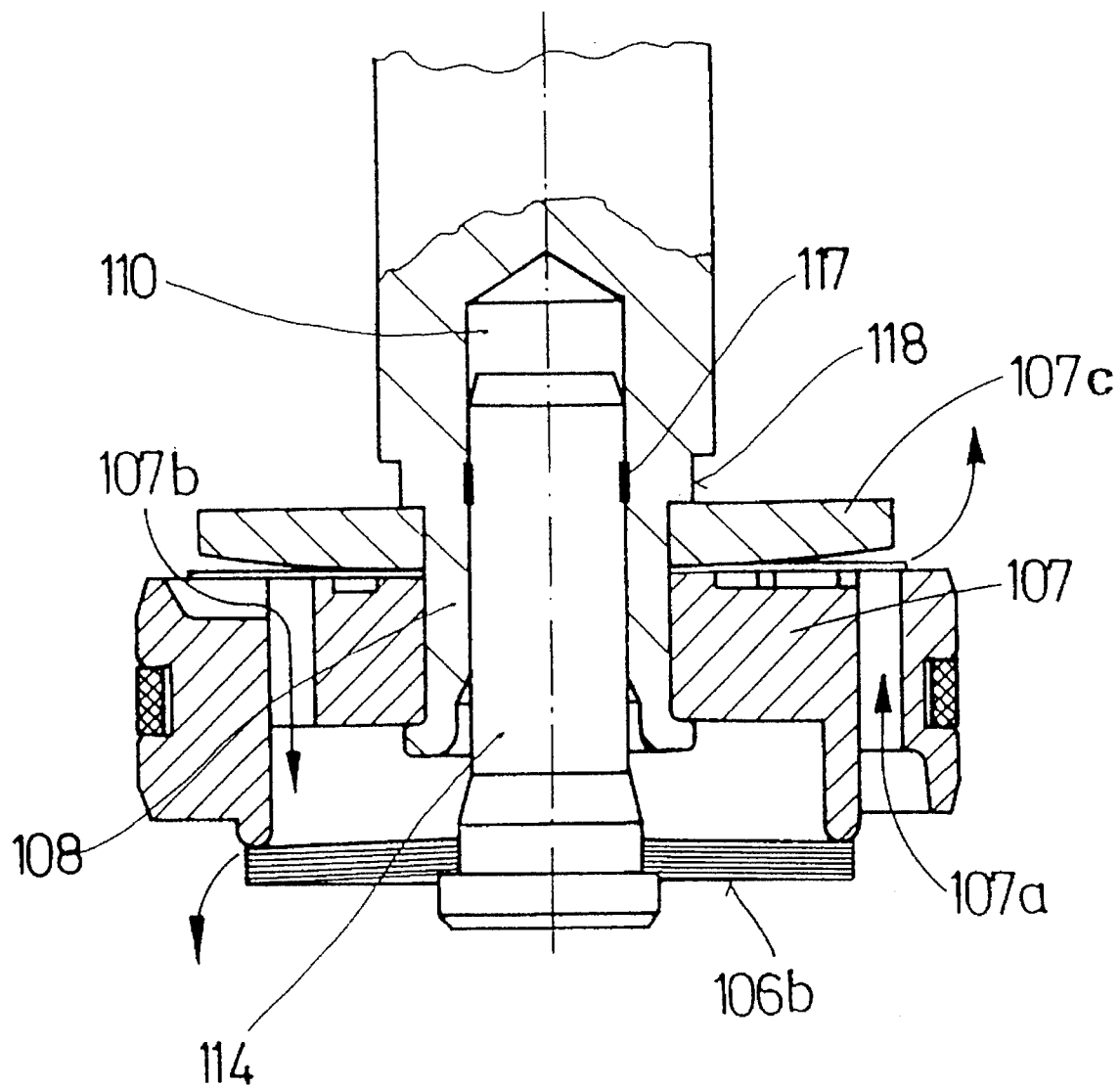

As shown in FIG. 7a, one embodiment of the present invention may include the passages 107a and 107b of the valve body 107. The piston 103 may also include a valve 107c. The passages 107a and 107b, and valve 107c are well known in the art and will not be discussed further here.

FIGS. 8a–8d illustrate one example of the sequence of an automatic assembly process. In FIG. 8a, valve discs 106a and the valve body 107 are preferably threaded onto the piston rod 102, which are then (FIG. 8b) preferably connected together by means of the riveted joint 115. The valve discs 106b are then (FIG. 8c) preferably assembled with the cylindrical element 114. After the application of a prestress (FIG. 8d), the fastening is preferably performed, e.g. by means of the weld 117.

Figure 9:
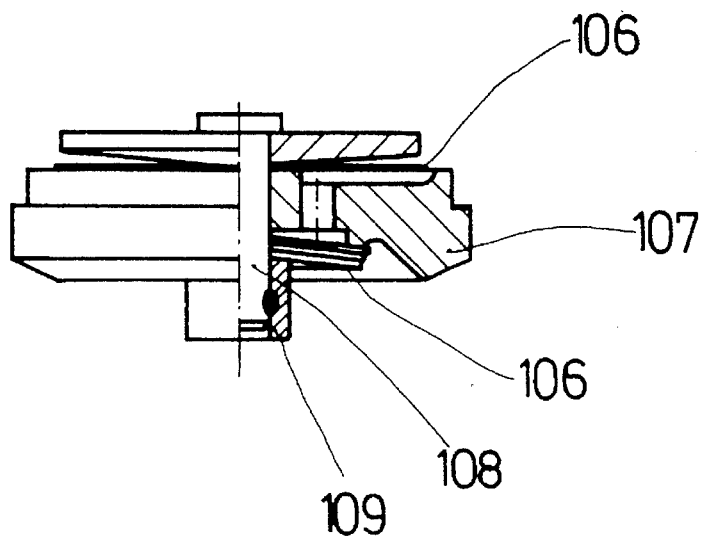
FIG. 9 illustrates a bottom valve of a shock absorber, partly in cross section and partly in a plan view.
Figure 9A:
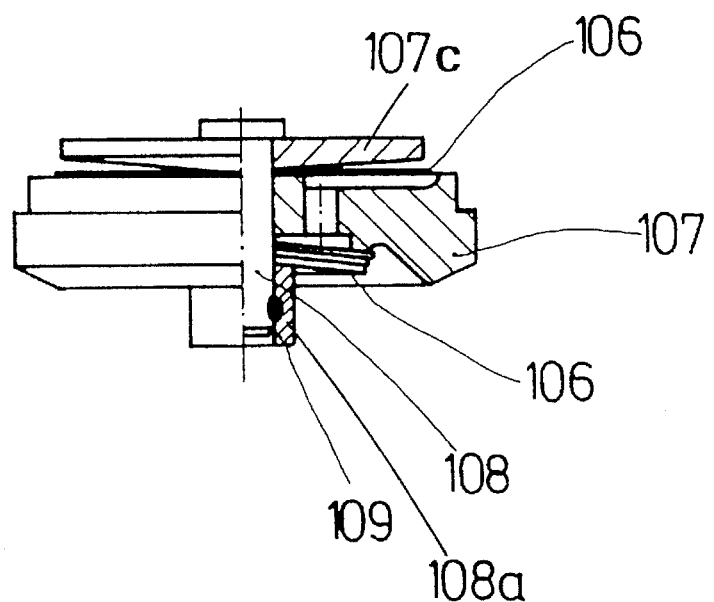
FIG. 9a shows substantially the same view as FIG. 9, but shows additional components.

FIG. 9 illustrates a bottom valve, in which bottom valve once again the valve discs 106 and the valve body 107 are preferably threaded onto the cylindrical component 108, and are axially prestressed preferably by means of a fastening element 109 and fastened by means of a weld joint 108a (see FIG. 9a). Alternatively, this weld joint 108a (see FIG. 9a) can preferably be replaced by a positive connection (not shown), in which the fastening element 109 and the cylindrical component 108 are preferably connected by means of an expander element 111, similar to the one illustrated in FIG. 5, which expander element 111 is preferably introduced in a hole (not shown) of the cylindrical component 108. Here again, it is also possible to shrink fit the fastening element 109 onto cylindrical component 108, similar to the arrangement illustrated in FIG. 6.

Various types of bottom valves in which the present invention may be incorporated in a manner similar to that described with regard to FIGS. 9 and 9a may be disclosed in U.S. Pat. No. 4,802,561 and U.S. Pat. No. 4,650,042, both cited previously herein.

Various types of forming processes which may conceivably be utilized in accordance with the embodiments of the present are disclosed in "Metal Forming Fundamentals and Applications", by Altan et al., published by the American Society for Metals in 1983. Pages 8 through 35 describe various forming techniques and methods which may be used to form various components of the present invention.

Various types of forming machines and forming tools which may conceivably be utilized to form various components of the present invention are also discussed in the aforementioned American Society for Metals publication on pages 103, 119, 120, 126, and 174–177. Some examples of forming machines discussed in the these pages are screw presses, crank presses, rolling mills, and hammers.

Further, the process of plastic deformation, which process in at least some aspects may apply to the forming of the various components of the embodiments of the present invention, is discussed on pages 45–82 of the aforementioned American Society for Metals publication.

The aforementioned American Society for Metals publication, namely "Metal Forming Fundamentals and Applications" the complete text thereof and the specific pages cited hereinabove, are hereby incorporated by reference as if set forth in their entirety herein.

Figure 10:
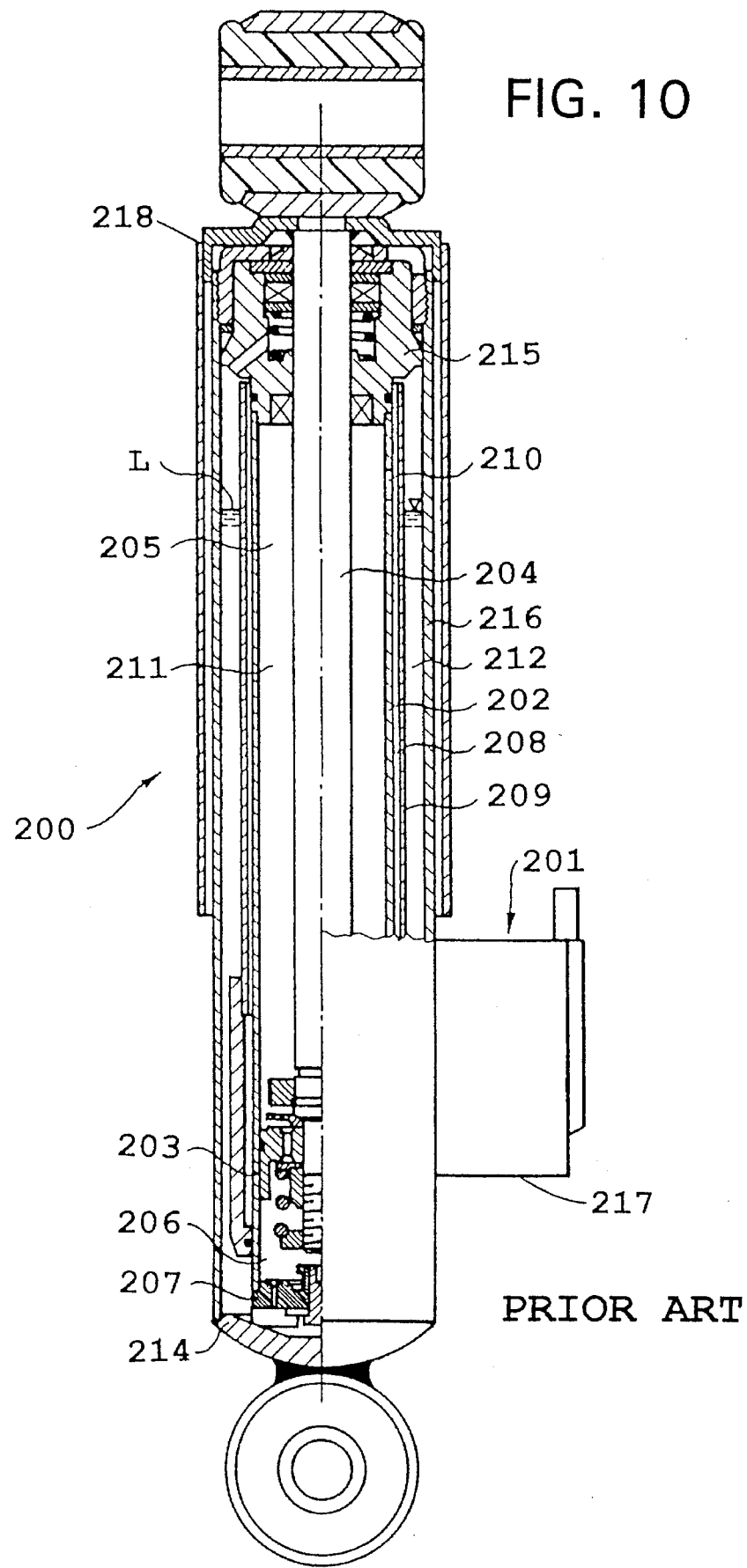
FIGS. 10 and 11 show a typical shock absorber in which the embodiments of the present invention could be incorporated.
Figure 11:
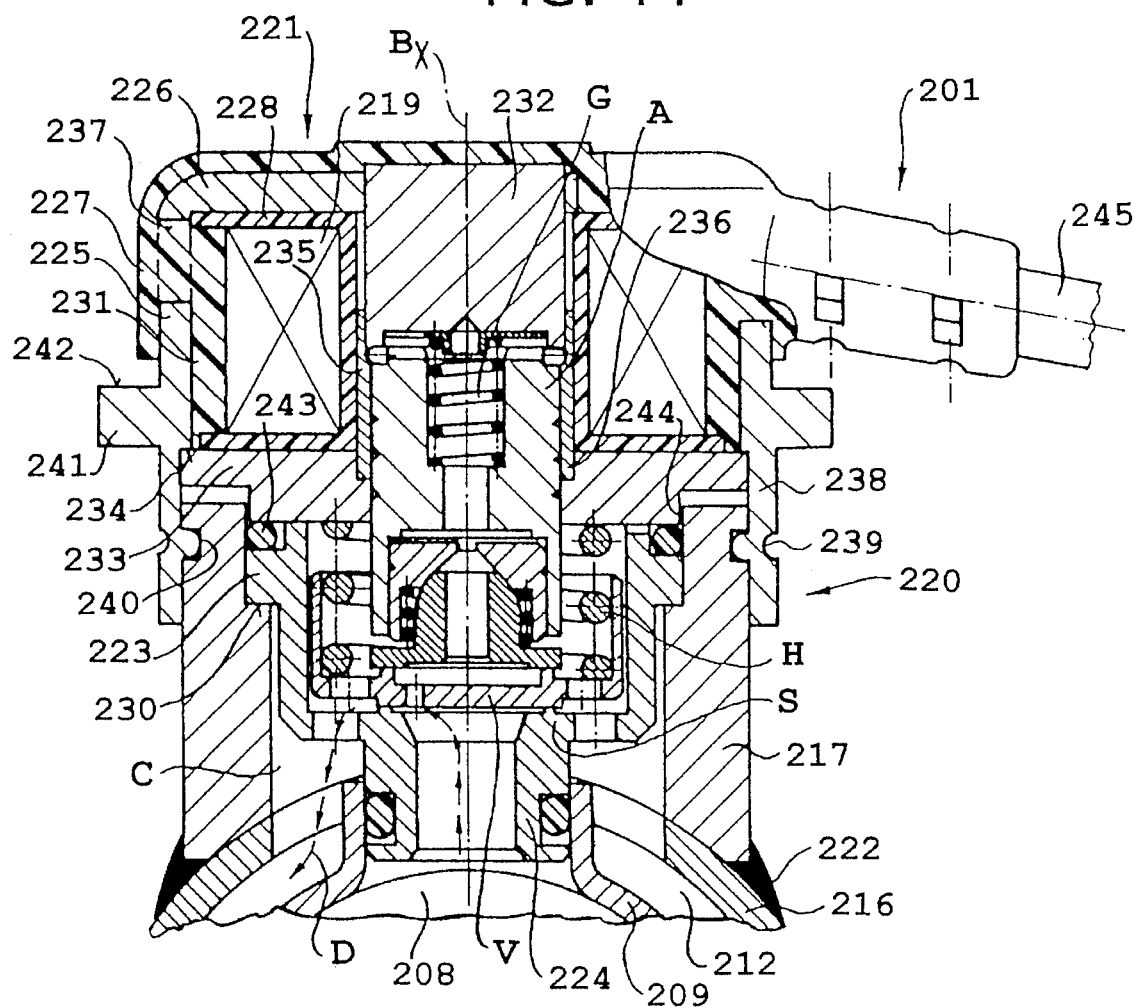

FIGS. 10 and 11 show a typical shock absorber or vibration damper in which the embodiments of the present invention may conceivably be incorporated. It should be understood that the components discussed hereinbelow with reference to FIGS. 10 and 11 may essentially be considered to be interchangeable with the components discussed hereinabove with reference to FIGS. 1 through 9a.

FIG. 10 shows a complete shock absorber or oscillation damper 200, a detailed illustration of the valve unit 201 being omitted for the sake of clarity. The oscillation damper 200 essentially includes a pressure pipe 202 in which a piston 203 on a piston rod 204 divides a working space 205 into an upper or piston-rod-side working chamber 206. A bottom valve unit 207 closes the pressure pipe 202 at the lower end thereof. A fluid path 208 is formed between the pressure pipe 202 and an intermediate pipe 209, said intermediate pipe 209 being arranged concentrically with respect to the pressure pipe 202. A connecting orifice 210 in the pressure pipe 202 connects the upper working chamber 211 with the fluid path 208. A compensating chamber 212 is confined between the intermediate pipe 209 and a portion of the pressure pipe 202, on the one hand, and the container tube 213 on the other hand. This compensating chamber 212 is axially limited by a base member 214 and a piston rod guiding and sealing unit 215. The working space 205 is separated by the piston 203 into the upper working chamber 211 and the lower working chamber 206. Both the upper and the lower working chambers are filled with a liquid. The compensating chamber 212 is also filled with damping liquid Up to the level L, and possibly contains a pressurized gas above the level L. The bottom valve unit 207 provides communication between the working chamber 206 and the compensating chamber 212. The piston 203 provides communication between the lower working chamber 206 and the upper working chamber 211. According to an illustrative example, the oscillation damper works as follows: When the piston rod 204 moves upwards, a high flow resistance occurs across the piston 203 and a high pressure is generated in the upper working chamber 211. Liquid from the upper working chamber 211 flows through said high flow resistance into the lower working chamber 206. As the piston rod 204 moves outward of the working space 205, the available volume within the working space 205 is increased. Therefore, liquid can flow from the compensating chamber 212 through the bottom valve unit 207 into the lower working chamber 206.

The flow resistance through the bottom valve unit 207 is small in this phase of operation. The movement of the piston rod 204 with respect to the pressure pipe 202 is damped.

On inward movement of the piston rod 204 fluid flows from the lower working chamber 206 through the piston 203 into the upper working chamber 211. The flow resistance across the piston 203 is relatively small and the flow resistance across the bottom valve unit 207 is relatively large. Therefore, a considerable pressure exists even within the upper working chamber 211. The volume within the working space 205 is reduced by the piston rod 204 entering into the working space 205. Thus, damping liquid must flow from the lower working chamber 206 through the bottom valve unit 207 into the compensating chamber 212. In this phase of operation the flow resistance through the bottom valve unit 207 is high such that a high pressure occurs within the lower working chamber 206 and also within the upper working chamber 211.

By the connecting orifice 210 and the fluid path 208 the upper working chamber 211 is connected with the compensating chamber 212 via the valve unit 201. This is shown in more detail in FIG. 11, which will be described later. As long as the valve unit 201 is closed, the bypass established by the connecting orifice 210, the fluid path 208 and the valve unit 201 is also closed. This is the hardest mode of operation of the oscillation damper. When, however, the valve unit 201 is more or less opened, the bypass is also open. As a result thereof the following behavior exists: On upward movement of the piston rod 204 liquid can flow from the highly pressurized upper working chamber 211 not only across the piston 203 providing a high flow resistance but also from the working chamber 211 through the bypass 210, 208, 201 to the compensating chamber 212. Such, the damping force is reduced.

When the piston rod 204 moves downwards, there exists again a high pressure within the upper working chamber 211, as described above. Therefore, damping liquid can flow from the upper working chamber 211 through the bypass 210, 208, 201 to the compensating chamber 212. This means that the damping liquid which must be expelled from the working space 205 as a result of the reduced volume therein does not only escape through the bottom valve unit 207 to the compensating chamber 212 but can also partially escape through the bypass 210, 208, 201 to the compensating chamber 212. Such, the damping force is again reduced by the open bypass 210, 208, 207. It is to be noted that the direction of flow of the damping liquid through the bypass 210, 208, 207 is the same, both on upward movement and downward movement of the piston rod 204 with respect to the pressure pipe 202. By increasing the flow resistance through the valve unit 201 the damping force can be increased both for upward and downward movement of the piston rod 204, and by increasingly opening the valve unit 201 the damping force can be reduced both for upward movement and downward movement of the piston rod 204. It is possible to selectively open and close the valve unit or to continuously vary the flow resistance through the valve unit 201.

In FIG. 11 one can again see the fluid path 208 and the, compensating chamber 212, which are interconnectable through the valve unit 201. The fluid path 208 is connected to the upper working chamber 211 as shown in FIG. 10. The flow direction from the fluid path 208 to the compensating chamber 212 across the valve unit 201 is indicated in FIG. 11 by the dotted line D provided with arrows indicating the flow direction both for inward movement and outward movement of the piston rod 204 with respect to the pressure pipe 202. One can see in FIG. 11 a valve member V Which can be lifted with respect to a valve seat S, such as to open the flow path D from the fluid path 208 to the compensating chamber 212.

For explaining the principles of the embodiment of the present invention shown in FIGS. 10 and 11, it is sufficient to say that the valve member V is urged downward in the closing sense towards the valve seat S by a helical compression spring H and that the valve member V can be lifted in response to upward movement of an electromagnetic armature member A. This armature member A is biased in downward direction by a helical compression spring G and can be lifted by energization of a magnetic coil 219 which is energized through a current supple cable 245.

The valve unit 201 comprises a housing 220. This housing 220 is composed by the side tube 217 and a cover unit 221. The side tube 217 is welded at 222 to the container tube 216. The cover unit 221 is fastened to the side tube 217.

A pot-shaped valve components housing 233 is inserted into the side tube 217 and Is axially located on a shoulder face 230 inside the side tube 217. Various valve components are located inside the valve components housing 223. The lower end of the valve components housing 223 is shaped as a tube section 224, which provides the valve seat S and is sealingly connected to the fluid path 208.

The cover unit 221 comprises an iron jacket 225 integral with an iron end wall 226. The iron jacket 225 and the iron end wall 226 are coated with a plastic layer 227. The annular electromagnetic coil 219 is housed within the iron jacket 225. This electromagnetic coil 219 is carried by a coil carrier 228, which is annular about the axis $B_x$ and is open in radial outward direction. The coil carrier 228 is closed in radially outward direction by a plastics material 229 integral with the plastic layer 227 through openings 237 of the iron jacket 225. The plastics layer 227 and the plastics material 231 are integrally moulded by injection moulding with the iron jacket 225, the iron end wall 226 integral therewith and the electromagnetic coil 219 carrier 228 being inserted into the injection mould.

A ferromagnetic core 232 is inserted into a central opening of the iron end wall 226 and covered by the plastics layer 227. An iron flange portion 233 is provided at the lower side of the electromagnetic coil 219 and is engaged with a shoulder face 234 of the iron jacket 225. A pole tube 235 is seated within an annular recess 236 of the iron flange portion 233. The pole tube 235 is sealingly connected to the iron flange portion 233 and to the ferromagnetic core 232. The armature A is guided within the pole tube 235. The pole tube 235 is made of nonmagnetic material so that the magnetic field lines are deflected by the lower end of the pole tube 235. The iron jacket 225, the iron end wall 226, the ferromagnetic core 232 and the iron flange portion 233 form a ferromagnetic core arrangement which toroidally surrounds the electromagnetic coil 219.

The cover unit 221 is fastened to the side tube 217 by a sleeve-shaped extension 238 of the iron jacket 225. This sleeve-shaped extension 238 axially overlaps the side tube 217 by a circumferential bead 239 being embossed into a circumferential groove 240 on the radially outer face of the side tube 217. The iron jacket 225 is provided with a pretensioning flange 241. The pretensioning flange 241 offers a pretension face 242. The cover unit 221 can be pretensioned in downward direction as shown in FIG. 11 toward the container tube 216 by a pretensioning tool engaging the container tube 216, on the one hand, and the pretensioning face 242, on the other hand. Such, the iron flange portion 233 is pressed against the upper end of the valve components housing 223, the valve components housing 223 is engaged with the shoulder face 230 of the side tube 217, and the iron flange portion 233 is engaged with the shoulder face 234 of the iron jacket 225. The helical compression spring H is compressed between the iron flange portion 233 and the valve member V, which is seated on the valve seat S.

While maintaining this pretension of the cover unit 221 against the side tube 217, the bead 239 is rolled or caulked into the circumferential groove 240 of the side tube 217 so that after removing the pretensioning tool an internal pretension is maintained. A sealing ring 243 is, therefore, maintained in sealing engagement with the valve components housing 223, the iron flange portion 233 and the side tube 217. Such, the compartment C confined by the side tube 217 and the cover unit 221 is sealed against atmosphere. All components of the valve unit 201 are positioned with respect to each other, and the helical compression spring H as well as the helical compression spring G and further springs are biased to the desired degree.

It is to be noted that the upper end of the side tube 217 is radially engaged at 244 with the iron flange portion 233 such that when rolling or caulking the bead 239 into the groove 240, no deformation of the side tube 217 and of the iron jacket 225 can occur.

The electromagnetic coil 219 is completely separated from the liquid within the compartment C by the iron flange portion 233. The pretension during connecting the cover unit 221 and the side tube 217 is selected such that no play can occur.

One feature of the invention resides broadly in the valve for a hydraulic telescoping strut shock absorber, in which, running through a valve body, there are passages whose outlet-side openings are covered by ring-shaped valve discs, whereby the valve discs and the valve body are fastened and axially braced in line on a journal, characterized by the fact that at least some of the valve discs 6, 106 and the valve body 7, 107 are non-detachably fastened on the journal 9, 109.

Another feature of the invention resides broadly in the valve characterized by the fact that the fastening is a positive fit and/or a weld joint.

Yet another feature of the invention resides broadly in the valve characterized by the fact that the positive fit 13 is formed by the journal 9.

Still another feature of the invention resides broadly in the valve characterized by the fact that the journal 9 has a blind hole 15, so that a ring wall is formed which has an overhang in relation to the valve discs 6 and valve body 7 threaded over it, whereby the overhang forms the positive fit 13 by means of a riveted joint 14.

A further feature of the invention resides broadly in the valve characterized by the fact that there is an overlap 16 between the blind hole 15 and the valve body 7.

Another feature of the invention resides broadly in the valve characterized by the fact that inside the components axially braced in line, there is at least one supporting ring 11a/11b for the valve discs 6.

Yet another feature of the invention resides broadly in the valve characterized by the fact that the supporting ring 11b has a defined rolling contour.

Still another feature of the invention resides broadly in the valve characterized by the fact that the rolling contour is formed by two connected conical surfaces 20a/20b.

A further feature of the invention resides broadly in the valve characterized by the fact that it is realized in the form of a piston valve, in which a piston ring 18 is fastened with no undercutting on the valve body 7.

Another feature of the invention resides broadly in the valve characterized by the fact that the supporting ring 11a has a fastening surface 17 for the piston ring 18.

Yet another feature of the invention resides broadly in the valve characterized by the fact that the supporting ring 11a with its fastening surface 17 is partly supported on the end face of the valve body 7.

Still another feature of the invention resides broadly in the valve characterized by the fact that at least some of the valve discs 106 and the valve body 107 are threaded and braced onto a cylindrical component 108 and that, a fastening element 109 is fastened to the cylindrical component 108.

A further feature of the invention resides broadly in the valve characterized by the fact that the valve discs 106 facing the piston rod 102 and the valve body 107 are fixed axially.

Another feature of the invention resides broadly in the valve characterized by the fact that the cylindrical component 108 is a component of the piston rod 102.

Yet another feature of the invention resides broadly in the valve characterized by the fact that the cylindrical component 108 has a hole 110 in which a cylindrical component 114 provided with the valve discs 106 is fixed.

Still another feature of the invention resides broadly in the valve characterized by the fact that the cylindrical component 108 is surrounded by the fastening element 109 and the cylindrical component 108 is expanded from inside to outside.

A further feature of the invention resides broadly in the valve characterized by the fact that the expansion of the cylindrical component 108 is accomplished by means of an expander element ill housed in a hole 110 of the cylindrical component 108.

Another feature of the invention resides broadly in the valve characterized by the fact that the expander element 111 is a sphere.

Yet another feature of the invention resides broadly in the valve characterized by the fact that the cylindrical component 108 and/or the fastening element 109 is/are provided on the surfaces facing one another with at least one projection 112 and/or one recess 113.

Still another feature of the invention resides broadly in the valve characterized by the fact that the projection 112 and/or the recess 113 run in an annular fashion over the entire circumference.

A further feature of the invention resides broadly in the valve characterized by the fact that the fastening element 109 is made of light metal or a light metal alloy and is shrink-fitted on the cylindrical component 108 in a contactless manner by electrically pulsed magnetic fields.

Examples of shock absorber assemblies and components associated therewith, which may be utilized in accordance with the embodiments of the present invention, may be found in the following U.S. Pat. Nos. 4,986,393, which issued to Preukschat et al. on Jan. 22, 1991; 4,749,070, which issued to Moser et al. on Jun. 7, 1988; and 4,723,640, which issued to Beck on Feb. 9, 1988.

All of the patents, patent applications and publications recited herein, and in the Declaration attached hereto, are hereby incorporated by reference as if set forth in their entirety herein.

Federal Republic of Germany Patent Application Nos. P 43 15 457.3, filed on May 10, 1993, and P 43 15 458.1, filed on May 10, 1993, having inventors Andreas Förster, Andreas Sieber, Wolfgang Schuhmacher and Hubert Beck, and DE-OS P 43 15 457.3 and P 43 15 458.1 and DE-PS P 43 15 457.3 and P 43 15 458.1, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A shock absorber for a motor vehicle, said shock absorber comprising:

a cylinder defining a chamber therein, said cylinder containing a damping fluid;

a piston rod sealingly projecting into said cylinder and being axially displaceable within said said cylinder;

a piston attached to said piston rod, said piston being slidably disposed within said cylinder to sealingly divide said chamber into first and second chambers;

means for permitting fluid communication between said first chamber and said second chamber;

a first end and a second end;

said cylinder being disposed between said first end and said second end;

said first end comprising first means for connecting said shock absorber to a first body;

said second end comprising second means for connecting said shock absorber to a second body;

said piston rod comprising a cylindrical protrusion;

means for fastening said cylindrical protrusion and said piston together;

said fastening means comprising a portion, said portion comprising means for being destroyed during the removal of said cylindrical protrusion from said piston, said means for being destroyed being the portion within said fastening means for holding said cylindrical protrusion and said piston together, whereby said cylindrical protrusion and said piston are substantially nondetachable from one another, said cylindrical protrusion and said piston being detachable from one another only upon substantial destruction of said means for being destroyed;

said means for being destroyed comprises a substantial portion of said fastening means;

said means for being destroyed comprises at least one weld;

said fastening means further comprises a cylindrical sleeve disposed about said cylindrical protrusion;

said cylindrical sleeve comprises a first end and a second end, said second end being disposed adjacent said piston and said first end being disposed a substantial distance from said first end;

said cylindrical protrusion and said cylindrical sleeve are fastened to one another by said at least one weld;

said cylindrical sleeve comprises at least one of a) and b):
a) an opening disposed at said first end of said cylindrical sleeve; and
b) a bottom portion disposed at said first end, said bottom portion substantially enclosing said cylindrical protrusion within said cylindrical sleeve;

said piston comprises valve means disposed about said cylindrical protrusion;

said valve means comprises disc means for regulating fluid flow in said means for permitting fluid communication;.

said piston further comprises a piston body;

said fastening means axially fastens said valve means against said piston body and said fastening means axially fixes said piston body on said cylindrical protrusion;

said fastening means fastens said cylindrical protrusion and said piston together such that at least one of: a portion of said cylindrical protrusion and a portion of said piston is destroyed upon the removal of said cylindrical protrusion from said piston;

said means for permitting fluid communication comprises:
a first passage and a second passage;

said disc means comprises:
a first disc packet and a second disc packet;
said first disc packet and said second disc packet each having at least one disc;
said first passage comprises a first opening and a second opening;
said second passage comprises a third opening and a fourth opening;
said first disc packet is disposed adjacent said first opening of said first passage and said third opening of said second passage; and
said second disc packet is disposed adjacent said second opening of said first passage and said fourth opening of said second passage.

2. A method of making a shock absorber for a motor vehicle, the shock absorber comprising: a cylinder defining a chamber therein, the cylinder containing a damping fluid; a piston rod sealingly projecting into the cylinder and being axially displaceable within the cylinder; a piston attached to the piston rod, the piston being slidably disposed within the cylinder to sealingly divide the chamber into first and second chambers; means for permitting fluid communication between the first chamber and the second chamber; a first end and a second end; the cylinder being disposed between the first end and the second end; the first end comprising first means for connecting the shock absorber to a first body; the second end comprising second means for connecting the shock absorber to a second body; the piston rod comprising a cylindrical protrusion; means for fastening the cylindrical protrusion and the piston together; the fastening means comprising a portion; said portion comprising means for being destroyed during the removal of the cylindrical protrusion from the piston, the means for being destroyed being the portion of the fastening means for holding the cylindrical protrusion and the piston together, whereby the cylindrical protrusion and the piston are substantially non-detachable from one another, the cylindrical protrusion and the piston being detachable from one another only upon substantial destruction of the means for being destroyed; said method comprising the steps of:

providing the cylinder, the cylinder defining a chamber therein, the cylinder containing a damping fluid;

providing the piston rod, the piston rod sealingly projecting into the cylinder and being axially displaceable within the cylinder;

providing the piston, the piston being attached to the piston rod, said piston being slidably disposed within the cylinder to sealingly divide the chamber into first and second chambers;

providing the means for permitting fluid communication between the first chamber and the second chamber;

providing the first end and the second end, the cylinder being disposed between the first end and the second end;

said providing of the first end comprising:
providing the first means for connecting the shock absorber to a first body;

said providing of the second end comprising:
providing the second means for connecting the shock absorber to a second body;

said providing of the piston rod comprising:
providing the cylindrical protrusion;

said method further comprising the steps of:
forming the means for fastening the cylindrical protrusion and the piston together;

said step of forming the fastening means comprises:
forming the means for being destroyed during the removal of the cylindrical protrusion from the piston, the means for being destroyed being formed for holding the cylindrical protrusion and the piston together, whereby the cylindrical protrusion and the piston are substantially non-detachable from one another, the cylindrical protrusion and the piston being detachable from one another only upon substantial destruction of the means for being destroyed;

said step of forming the means for being destroyed further comprises:
forming the means for being destroyed on a substantial portion of the fastening means;
providing at least one weld;

said providing of the fastening means comprises:
providing a cylindrical sleeve disposed about the cylindrical protrusion;

said providing of the cylindrical sleeve comprises:
providing a first end and a second end, the second end being disposed adjacent the piston and the first end being disposed a substantial distance from the second end;

fastening the cylindrical protrusion and the cylindrical sleeve to one another with the at least one weld;

said providing of the cylindrical sleeve comprises at least one of a) and b):
a) providing an opening disposed at the first end of the cylindrical sleeve; and
b) providing a bottom portion disposed at the first end, the bottom portion substantially enclosing the cylindrical protrusion within the cylindrical sleeve;

said providing of the piston comprises:
providing valve means;
disposing the valve means about the cylindrical protrusion;

said providing of the valve means comprises:
providing disc means;
regulating fluid flow in the means for permitting fluid communication by means of the disc means;

said providing of the piston comprises:
providing a piston body;

axially fastening the valve means against the piston body by means of the fastening means;

axially fixing the piston body on the cylindrical protrusion by means of the fastening means;

said step of forming the fastening means further comprises fastening said cylindrical protrusion and said piston together such that at least one of: a portion of said cylindrical protrusion and a portion of said piston is destroyed upon the removal of said cylindrical protrusion from said piston;

said providing of the means for permitting fluid communication further comprises:
  providing a first passage and a second passage;

said providing of the disc means further comprises:
  providing a first disc packet and a second disc packet, said first disc packet and said second disc packet each having at least one disc;
  said providing of the first passage further comprises providing a first opening and a second opening;
  said providing of the second passage further comprises providing a third opening and a fourth opening;

said method further comprising:
  disposing said first disc packet adjacent said first opening of said first passage and said third opening of said second passage; and
  disposing said second disc packet adjacent said second opening of said first passage and said fourth opening of said second passage.

* * * * *

UNITED STATES PATENT AND TRADEMARK OFFICE
CERTIFICATE OF CORRECTION

PATENT NO. : 5,547,050
DATED : August 20, 1996
INVENTOR(S) : Hubert BECK

It is certified that error appears in the above-indentified patent and that said Letters Patent is hereby corrected as shown below:

In column 3, line 8, after 'section;', delete "p".

In column 5, line 1, before the first occurrence of '4', delete "FIG." and insert --FIGS.--.

In column 5, line 8, after '106a', delete "and-the" and insert --and the--.

In column 5, line 19, after 'FIG.', delete "4a." and insert --4.--.

In column 5, line 61, after the second occurrence of '107c', delete "can-serve" and insert --can serve--.

In column 11, line 36, after 'element', delete "ill" and insert --111--.

Signed and Sealed this

Seventh Day of January, 1997

Attest:

BRUCE LEHMAN

Attesting Officer

Commissioner of Patents and Trademarks